No. 702,250. Patented June 10, 1902.
J. W. SHARP.
DRAG FOR GATHERING MUSSELS.
(Application filed Mar. 1, 1902.)
(No Model.)
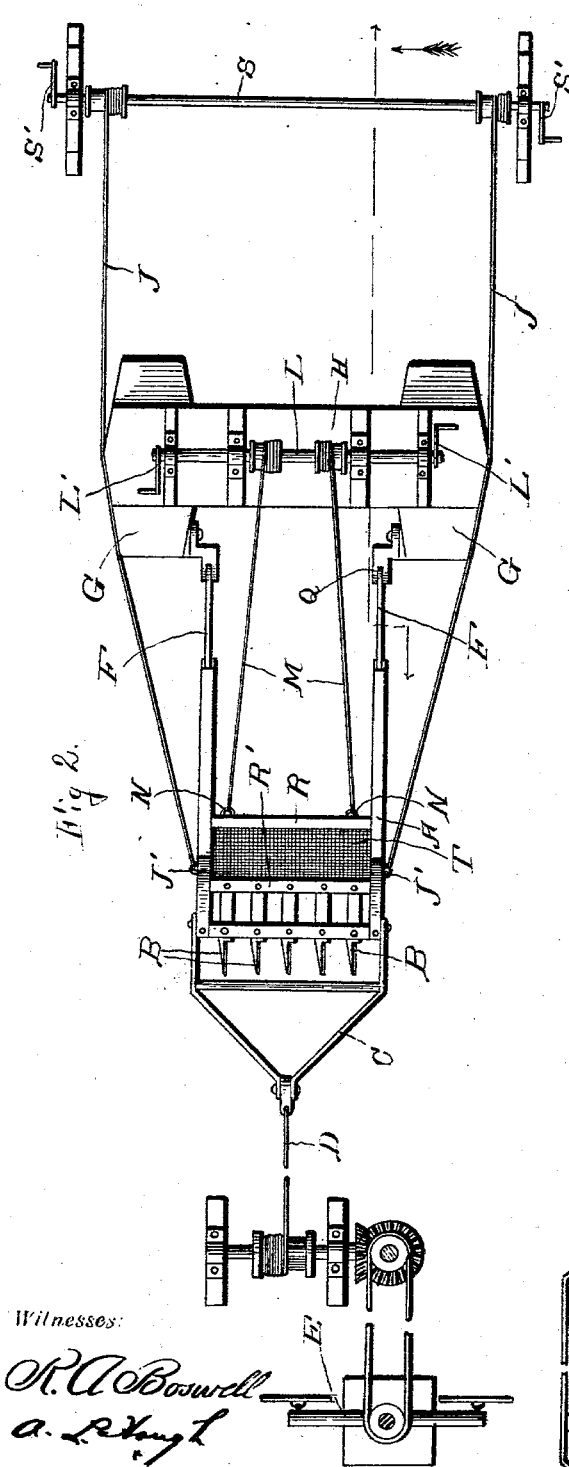
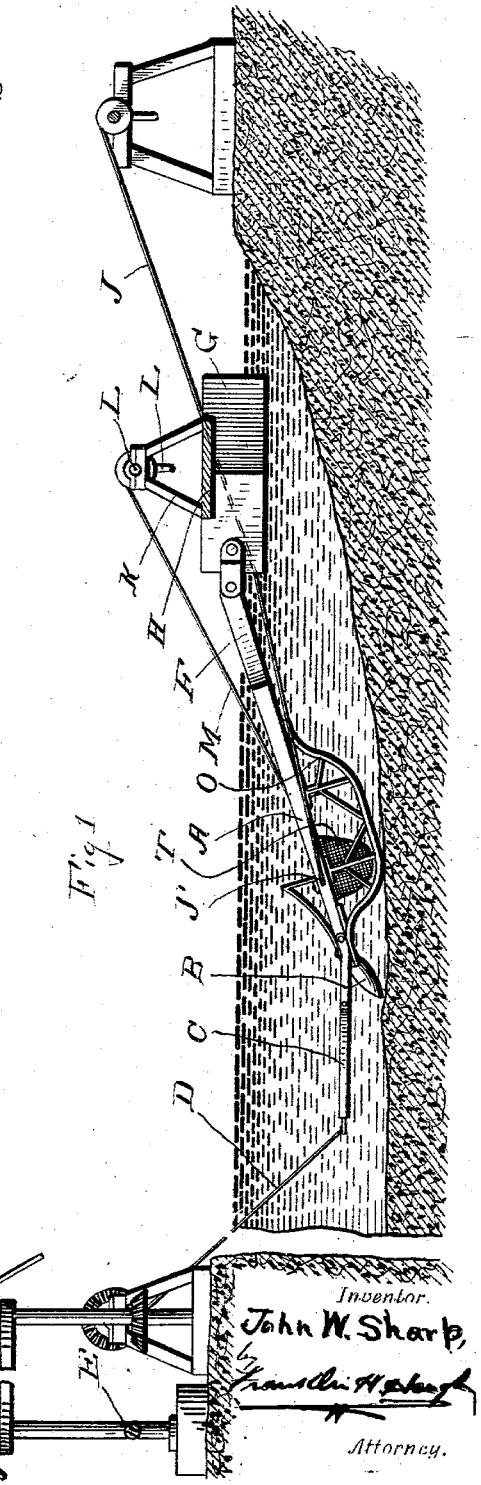
Witnesses:
R. A. Boswell
A. L. Vough
Inventor.
John W. Sharp,
by Franklin H. Hough
Attorney.
THE NORRIS PETERS CO., PHOTO-LITHO., WASHINGTON, D. C.

UNITED STATES PATENT OFFICE.

JOHN W. SHARP, OF SIDNEY, ARKANSAS.

DRAG FOR GATHERING MUSSELS.

SPECIFICATION forming part of Letters Patent No. 702,250, dated June 10, 1902.

Application filed March 1, 1902. Serial No. 96,303. (No model.)

*To all whom it may concern:*

Be it known that I, JOHN W. SHARP, a citizen of the United States, residing at Sidney, in the county of Sharp and State of Arkansas, have invented certain new and useful Improvements in Drags for Gathering Mussels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in means for gathering mussels, and comprises a drag which is provided with rake-teeth for gathering up the mussels as the drag is drawn across the bed of a stream, suitable runners being provided on the drag, and boats on which the handles of the drag are supported and means being provided for raising and lowering the drag and the provision of a windlass whereby the device may be drawn backward.

The invention relates, further, to various details of construction, which will be hereinafter more fully described and then specifically defined in the appended claims.

The invention is clearly illustrated in the drawings, which, with the letters of reference marked thereon, form a part of this application, and in which drawings I have shown, in—

Figure 1, a side elevation showing the dredge connected to the means for actuating the same, and Fig. 2 is a top plan view of the device.

Reference now being had to the details of the drawings by letter, A designates the frame of the dredge, which has a series of teeth B along its forward edge spaced apart, and connected to the forward end of the drag or dredge is a tongue C, connected by means of a rope D to the power E, which may be of any suitable kind and which is adapted to be located on one bank of a stream being dragged. To the rear end of the longitudinal beams of the frame are fastened handles F, and G G designate boats or floats, which are connected together by means of a platform H, and mounted on said platform are standards K, on the upper edge of which is journaled a windlass L, having handles L' at the ends thereof. Winding about said windlass are the ropes M, which are connected to the eyes N, fastened to the frame. On the inner edges of each boat are the cleats or socket-plates Q, in which the ends of said handles are adapted to rest.

On the under side of the drag or dredge are the runners O, which are adapted to rest upon the bed of the creek as the drag is drawn backward and forward across the stream.

Intermediate the two cross-pieces R and R' of the frame is a bag T, made, preferably, of interwoven wire or netting, provided to receive the mussels as they are scooped up by the teeth at the forward end of the drag or dredge.

On one bank of the stream is mounted a windlass S, having handles S' secured to its ends, and winding about said windlass S are chains or ropes J, which are fastened to the eyes J' on the opposite sides of the frame. These ropes or chains J and the windlass are provided for the purpose of drawing the dredge or drag back to a starting position across the stream after the dredge or drag has been drawn by the horse or other power forward on the bed of the stream for the purpose of gathering up mussels. By means of the windlass L, carried on the platform connecting said boats, the angle at which it is desired to have the drag disposed may be regulated by raising or lowering the drag. When the drag is in its normal position, the free ends of the handles rest in said socket members Q on the adjacent edges of the boats.

From the foregoing it will be seen that by the provision of an invention embodying the features of my mussel-drag I am able to thoroughly gather up the mussels, which are allowed to drop into the bag adjacent to the teeth on the forward end of the frame, and an operator by manipulating the windlass on the platform connecting the boats may easily regulate the drag by raising or lowering the frame to cause the teeth to gather up a smaller or greater quantity of the mussels.

Having thus fully described my invention, what I claim as new, and desire to secure by Letters Patent, is—

1. A drag or dredge for gathering mussels comprising a frame having teeth at its forward edge, runners on which the frame rests, a bag for receiving the mussels, handles secured to the drag, and a float for supporting said handles, and means for raising and lowering the drag or dredge, as set forth.

2. A drag for gathering mussels comprising a frame having teeth at its forward edge, runners for said frame, handles projecting from the ends of the frame, boats or floats and a platform connecting the same, the ends of said handles supported by said boats, a windlass mounted on said platform and having ropes winding about the same connected to the frame of the drag whereby the latter may be raised or lowered, as set forth.

3. In combination with a drag for gathering mussels having teeth at its forward end, runners for the frame, a bag for receiving the mussels, handles projecting from the rear end of the frame, boats having socket members on the adjacent edges thereof adapted to receive the ends of said handles, a platform connecting the boats, a windlass mounted on said platform and having ropes wound about said windlass and connected to the opposite side of the frame, a second windlass designed to be mounted on the shore of a stream having cable wound about the same connected to the said frame, and power means for drawing the dredge forward, as set forth.

In testimony whereof I hereunto affix my signature in presence of two witnesses.

JOHN W. $\overset{\text{his}}{\times}$ SHARP.
mark

Witnesses:
J. I. JONES,
T. F. FELTS.